United States Patent [19]

Stender

[11] Patent Number: 5,193,231

[45] Date of Patent: Mar. 16, 1993

[54] LAVATORY HAVING A DISPENSER FOR EXCREMENT BAGS AND CONTROL AND EXCREMENT BAG FOR THIS PURPOSE

[76] Inventor: Elisabeth Stender, El Pedral A 302, Encamp, Andorra

[21] Appl. No.: 516,147

[22] Filed: Apr. 30, 1990

[30] Foreign Application Priority Data

May 3, 1989 [CH] Switzerland .................. 1678/89

[51] Int. Cl.⁵ .............................................. A47K 11/02
[52] U.S. Cl. .......................................... 4/449; 4/471; 4/473
[58] Field of Search .................. 4/449, 471, 473, 479, 4/483, 484; 206/225, 233, 556

[56] References Cited

U.S. PATENT DOCUMENTS

3,401,409  9/1968  Ekrut ..................................... 4/489
3,457,567  7/1969  Criss ..................................... 4/484

Primary Examiner—Henry J. Recla
Assistant Examiner—David J. Walczak

[57] ABSTRACT

A lavatory has a lavatory bowl having an upper side on which a seat edge is provided and a lower side on which a base connection is provided, a dispenser for excrement bags that can be removed individually from the dispenser and secured to the seat edge with the aid of a vacuum, and a vacuum line that enters the lavatory bowl and a suction line. The dispenser has a receptacle for a stack of excrement bags that lie flat one on top of the other. The seat edge is provided with suction holes that can be connected to the suction line. The seat edge and the dispenser are moveable relative to each other and can be brought into a relative position in which the seat edge and the flat-lying excrement bags are parallel to one another, whereby the foremost of the excrement bags can be sucked out of the dispenser by negative pressure in the suction line.

28 Claims, 4 Drawing Sheets

LAVATORY HAVING A DISPENSER FOR EXCREMENT BAGS AND CONTROL AND EXCREMENT BAG FOR THIS PURPOSE

The invention relates to a lavatory and to a control and excrement bag for this purpose.

BACKGROUND OF THE INVENTION

A lavatory which can also manage without flushing water and without chemicals is described in outline in DE-A-3433969. There, the bags (either folded on in the other in the form of lavatory paper or rolled up one after the other and cohesive) are removed from the dispenser with the aid of grippers and—according to the description—attached, in a manner not described in more detail, by means of a vacuum, to the lavatory seat forming the seat edge. The bags are then supposed to be sealed with the aid of the gripper and then disposed of. However, problems are encountered in practice because the thoroughly wet bags are no longer able to withstand the tensions which act on them during sealing by means of the gripper. Furthermore, the construction costs and the space requirement for the grippers are relatively high, the latter disadvantage being particularly acute precisely in the main applications of such lavatories, namely in land, air and water vehicles, because it is precisely there that space is relatively limited.

PRIOR ART

The way in which the prior art bags are arranged inside the dispenser is described, for example, by DE-A-2021142. In this known arrangement, however, an automated removal system for the bags is completely dispensed with (at any rate, none is described) and it would be relatively complicated to pull the bag off the roll, and susceptible to faults, since presumably only tensile forces can be used for this purpose.

DE-A-2310164 describes a lavatory seat, the edge of which is to be protected by a protective cover each time during use. For this purpose, the cover is in the form of a dispenser for the flat, approximately annular covers and can be brought into various relative positions by swivelling up and down with the lavatory seat connected to a suction line, the lowermost protective cover being sucked against the lavatory seat when the cover and lavatory seat are parallel to one another, so that the said protective cover covers the said lavatory seat. Although this system is suitable for accepting flat protective rings, no instructions are given as to how an excrement bag can be satisfactorily removed and unfolded—ready for use. This is because the conditions in the case of an excrement bag are in fact more complicated in that the latter not only must extend over the seat edge but also must be satisfactorily unfolded in order to save the user tedious and unpleasant manipulations.

OBJECT AND STATEMENT OF THE INVENTION

It is the object of the invention to provide a lavatory of the type stated at the outset which is compact and hygienic and operates reliably, and to do so by simple means. This object is achieved by the following features:

a lavatory bowl having an upper side on which a seat edge is provided and a lower side on which a base connection is provided, a dispenser for excrement bags that can be removed individually from said dispenser and secured to said seat edge with the aid of a vacuum, and a vacuum line that enters said lavatory bowl and a suction line, wherein said dispenser has a receptacle for a stack of excrement bags that lie flat one on top of the other, said seat edge is provided with suction holes that can be connected to said suction line, and said seat edge and said dispenser are moveable relative to each other and can be brought into a relative position in which said seat edge and said flat-lying excrement bags are parallel to one another, whereby the foremost of said excrement bags can be sucked out of said dispenser by negative pressure in said suction line.

Because the excrement bags lie flat one on top of the other in the dispenser, i.e. are not, for example, folded one in the other, they are easy to separate from one another or to grip individually. Because of the mobility of the seat edge and/or dispenser in the position where they are parallel to one another, it is possible to avoid a removal means which is complicated and bulky, the parallel relative positions together with suction of the bags ensuring satisfactory removal from the dispenser. It is true that DE-A-2021142 has already proposed providing the bags with stock folds which then unfold in use (to form the bag cavity). However, according to the description, unfolding is supposed to take place under the weight of the contents falling in. This is, in general, unhygienic and unpleasant for the user. To avoid such a disadvantage, the vacuum line is provided—in view of the vacuum required in any case for suction of the bag—giving rise to only a slightly more complicated design and hence ensuring satisfactory unfolding of each bag by suction from underneath.

Furthermore, the measure of having a vacuum line entering the lavatory bowl is, in principle, disclosed in U.S. Pat. No. 3,772,712. There, however, this vacuum line is also connected via the lavatory bowl to the suction holes of the seat edge which projects inward over the lavatory bowl and the suction holes of which end in the interior of the bowl. However, this firstly has the disadvantage that the seat edge has to be relatively thin and unstable. It is even made of wood, so that, as a result of working the material, the holes in this material may be shifted with respect to the base, with the result that the suction effect is called into question. In particular, however, the vacuum on the one hand has the object of keeping the bag unfolded and on the other hand of fixing its edges. Here, it will be difficult to find the right conditions, since—for example, because of a fold in the bag—the suction pressure does not act sufficiently on the edge, so that there is a danger that the bag will be sucked directly into the lavatory bowl without having been used. However, if the suction pressure at the seat edge is too high, it will be difficult to detach the bag from the seat edge again, especially since the particular design of this known lavatory requires the fan to be virtually constantly in operation for odor extraction.

In contrast, the invention involves for the first time the idea of using two different vacuum connections, i.e. the stated suction line and the vacuum line, which can now be dimensioned (or set by the inclusion of adjusting valves) in such a way that the pressure which is optimal for the particular function prevails at each point. As will be evident subsequently, this duality moreover permits effective control, in which the stated connections are each operated separately.

The described embodiments include the following additional advantageous features:

Said seat edge is formed on a lavatory seat that is fastened so that it can rotate about an axle on said lavatory bowl.

Said first suction line is connected to said seat edge in the region of said axle to apply vacuum to said suction holes.

Said dispenser is fastened immobile to hold said stack of excrement bags in a substantially vertical position.

Said seat edge is formed by an edge of said lavatory bowl, and said dispenser can be brought from a rest position in which it is at a distance from said upper side of said lavatory bowl into a covering position in which it covers said lavatory bowl in the manner of a lid.

Said dispenser is arranged to be swivelled about a horizontal axle, between said rest position and said covered position.

A motor is provided by means of which said seat edge and said dispenser can be brought into said relative position.

Said motor is a pneumatic motor having a piston/cylinder unit.

A bag storage chamber is connected via said base connection to a space enclosed by said lavatory bowl.

Said base connection is connected to a drop pipe.

Said drop pipe ends in a movable pipe bend.

A lock formed by two closures is provided between said lavatory bowl and said drop pipe.

A third suction line enters said lock.

Measures which, even independently of the method of bag removal, are of inventive importance are described as follows:

Said bag storage chamber is in the form of a cool chamber having a cooling means for the excrement.

Closure means are arranged to close said cool chamber.

A second suction line is connected to said cool chamber.

Said cool chamber is comprised of a removable collecting container enclosed by a stationary inlet and outlet line for a refrigerant.

Said cooling means for said cool chamber is designed to provide a temperature below −10 degrees C.

Said cooling means can be connected to cold outside air.

Said cooling means is designed to provide a temperature below −15 degrees C.

Although cooling of the excrement has already been described in DE-A-2105075, this known design is hardly suitable in practice. The reason is simply that cooling of the wall of the lavatory bowl to −15° C. must in practice inevitably give rise to an unpleasant sensation, if not to a health hazard, for the user. Even if it is considered that simultaneous heating of the outer surfaces is proposed, the required object can scarcely be achieved with an expensive system of this type (simultaneous heating and cooling). If the heating is actually intended to compensate the cooling effect, then the purpose of the cooling, i.e. substantial freedom from odor, is negated. Quite apart from this, the insertion of relatively rigid excrement bags from above into the lavatory bowl and removal manually by lifting them out are inconvenient, unhygienic and unreliable.

Probably because of the poor experience with the above design, there has been a failure to recognize the expediency and usefulness of cooling, which is suitable for certain applications, such as refrigerator ships or other refrigerator vehicles, and especially for aircraft which, in fact, fly at high altitudes with an air temperature of about −50° C., and DE-A-2902476 even describes measures for preventing freezing in a wet lavatory.

Because a cool room separated from the lavatory bowl is provided, the danger of undercooling of the user and unhygienic handling of the bags is avoided.

An excrement bag according to the invention comprises a pouch connected to a seat ring having a form corresponding to said seat edge and capable of being folded flat in a bellows-like manner.

The excrement bag is spirally folded.

The excrement bag is composed of degradable material.

The described embodiments disclose the following control means with reference to a used lavatory:

means for closing a valve in said suction line and a valve in said vacuum line in order to detach said excrement bag from said lavatory bowl;

means for opening a closure in order to remove said excrement bag;

means for switching on a motor in order to swivel said seat edge up to said dispenser;

means for opening said valve in said suction line to said suction holes in order to remove a new one of said excrement bags and to fix said new excrement bag to said seat edge;

means for closing said closure;

means for opening said valve to said vacuum line in order to unfold said excrement bag;

means for switching on said motor for swivelling down said seat edge and fixing it.

The described embodiments disclose the following additional control means with reference to a used lavatory:

means for switching on a motor in order to swivel said dispenser down on to said seat edge;

means for switching on a motor for raising said dispenser in order to swivel back said dispenser.

The described embodiments disclose the following additional control means:

control means which is time-dependent, for closing said valve to said vacuum line after said excrement bag has been unfolded, in order to save suction power during use;

control means, coupled with opening of a first closure, for opening a valve to a second suction line in order to facilitate conveying of said excrement bag into a cool chamber;

control means, coupled with opening of said first closure, for rotating a pipe bend for better distribution of said excrement bags in said cool chamber;

control means, coupled with opening of said first closure, for brief rotation of a cool container in the form of a collecting container, for better distribution of said excrement bags in said cool chamber;

control means for closing said first closure in order to reduce annoying odors and to create a closed vacuum space in said lavatory bowl in order to unfold said excrement bags;

control means, coupled with closing of said first closure, for closing said valve to said second suction line in order to save suction power after disposal of said excrement bag;

control means, coupled with raising of said swivelling dispenser, for opening said valve to the first suction line in order to fix said excrement bag firmly to said seat edge;

control means for opening said valve to said first suction line in order to provide vacuum for fixing said excrement bag firmly to said seat edge;

control means, coupled to a switch, to perform a disposal process and to provide a new excrement bag after said switch has been activated;

control means to prepare the lavatory for use, even if a previous user failed to activate said switch after use;

control means, coupled with removal of a final excrement bag from said dispenser, for fixing said swivelling dispenser;

control means, coupled with removal of a final excrement bag from said dispenser, for triggering a signal as an indication that said lavatory should not be used;

control means, coupled to a temperature sensor, for switching over from an outside air cooling system to an internal cooling means;

control means, coupled to a pressure gauge, for switching over of an internal pressure source to low outside pressure;

control means, coupled with opening of said first closure, for opening said valve to a third suction line into said lock, in order to facilitate conveying of said excrement bags into said lock;

control means, coupled with closing of said first closure, for opening said second closure and simultaneously opening said valve to said second suction line in order to facilitate conveying of said excrement bag from said lock into said cool chamber;

control means, coupled with closing of said first closure, for closing said valve to said third suction line into said lock and for simultaneously opening said second closure; and control means, coupled with closing of said first closure, for closing said valve to said second suction line in order to save suction power after disposal of said excrement bag.

Said control means for rotating said pipe bend rotates said pipe bend between about 20 to 45 degrees, coupled with opening of said first closure.

Controlling a lavatory system, DE-A-3026763 has already disclosed a relatively complicated, inconvenient and expensive system for a wet lavatory. In contrast, the control according to the invention is distinguished by its simplicity.

DESCRIPTION OF THE DRAWINGS

The invention is illustrated in more detail below with reference to embodiments, from which further important features are evident.

DESCRIPTION OF PREFERRED EMBODIMENTS

Figure 1:
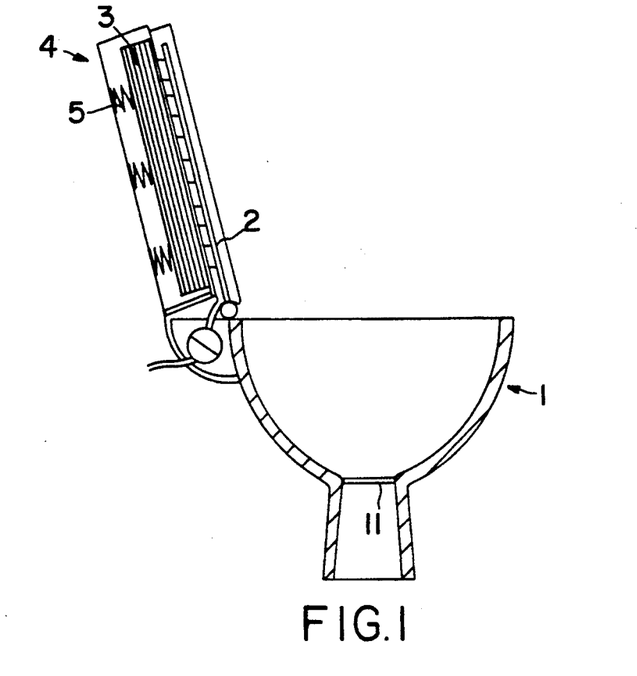
FIG. 1 shows a partial schematic vertical cross section through a lavatory having a bag dispenser, where a seat edge corresponding to a lavatory seat rests against the dispenser when swivelled up, in order to remove a bag.
Figure 2:
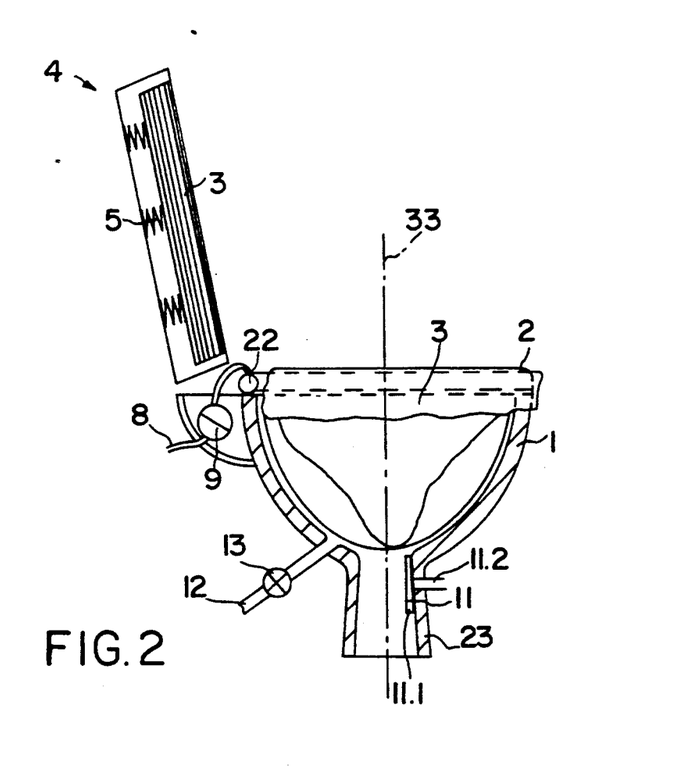
FIG. 2 shows a view similar to FIG. 1, a bag having been removed via the seat edge, and the seat edge and the bag being located in their horizontal position of use.
Figure 7:
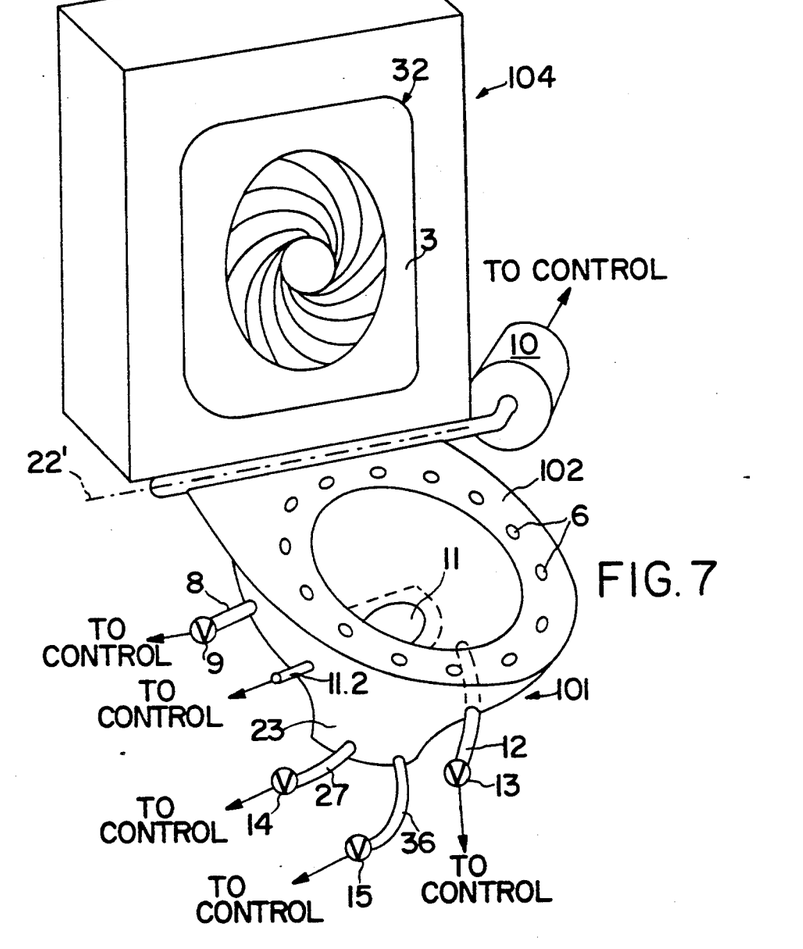
FIG. 7 shows a schematic representation of a lavatory with swivelling dispenser and a control.

FIGS. 1 and 2 show a conventional lavatory bowl 1 having a seat edge 2 which can be swivelled on the said bowl and is formed on a lavatory seat. In FIG. 1, the seat edge 2 has been swivelled up and rests against the foremost of the excrement bags 3, a stack of which is kept in a dispenser 4. The stack is pressed forward by springs 5. As shown in FIG. 7, the excrement bags are retained by the edge of the dispenser opening 32 only at their outermost edge.

Figure 3:
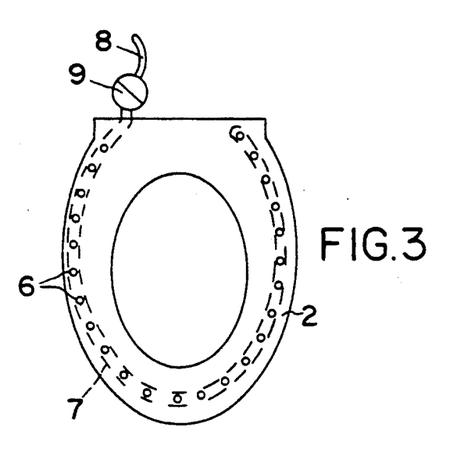
FIG. 3 shows a plan view of the seat edge.
Figure 8:
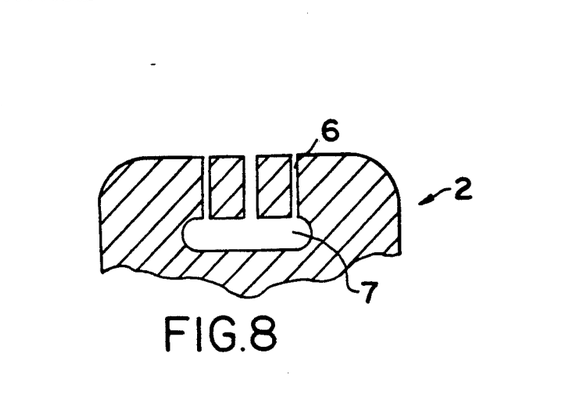
FIG. 8 shows a cross-section through the seat edge with a particular embodiment of the suction holes.

FIG. 3 shows that seat edge 2 is provided with suction openings 6 which are connected to a first suction line 8 via a suction channel 7. Furthermore, a vacuum valve 9 is provided in the suction line. When the valve opens, the excrement bag 3 is held against the seat edge 2 by means of the vacuum and over the suction holes 6. These suction holes 6, which on the one hand serve for providing the excrement bags 3 from the dispenser 4 and on the other hand also serve for fixing the excrement bags 3 during use, can consequently also be in the form of a large number of small suction holes 6 which are distributed over the surface of the seat edge 2 and end in a common suction channel 7 (FIG. 8).

FIG. 2 shows the seat edge 2 in the horizontal position of use on the lavatory bowl 1. It has taken the foremost of the excrement bags 3 with it, the said bag being shown in the drawing unfolded and projecting into the bowl. The motor 10 (FIG. 7), which, for example, is activated via the vacuum or is in the form of an electric motor, serves for for swivelling the seat edge 2 about the axle 22.

FIG. 2 shows that the base connection 23 of the lavatory bowl 1 can be closed by means of a pivotable closure 11. Pivotable closure 11 has a pivot axis 11.1 so as to enable a pivoting movement of the closure 11 from the open position shown in FIG. 2 into the closed position shown in FIG. 1. Lever 11.2 actuates the closure 11.

A further vacuum line 12 enters the lavatory bowl 1 via a valve 13. The purpose of this line is to bring the excrement bag 3 into the indicated, unfolded position of use; it is also possible to swivel the closure 11 by means of the vacuum which then prevails in the bowl 1. The closure 11 can, however, equally well be operated by means of a separate motor or, preferably, by means of a foot switch.

Figure 4:
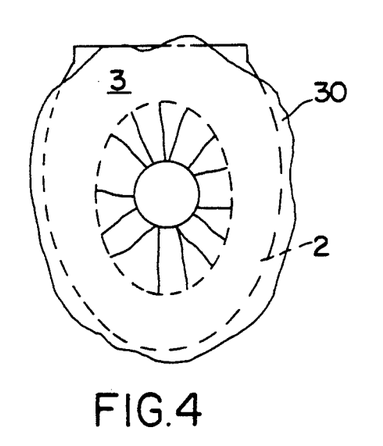
FIG. 4 shows a plan view of the seat edge with excrement bag.

FIG. 4 shows how the seat edge 2 is covered by the excrement bag 3, which in this case has a seat ring 30 projecting outward over the seat edge 2.

Figure 5:
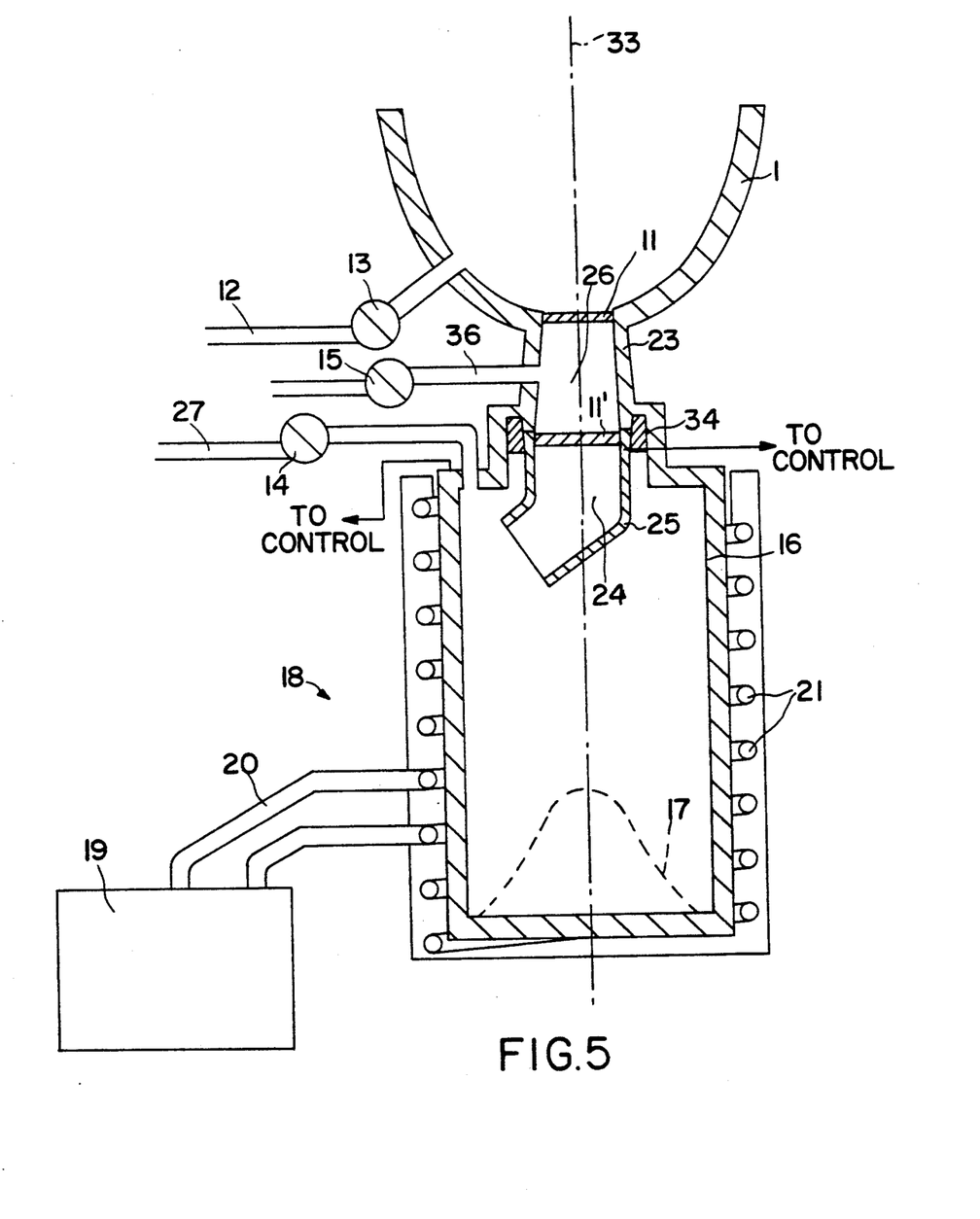
FIG. 5 shows a schematic vertical cross section through a lavatory bowl with a connected collecting container for the excrement bags and cooling means.

FIG. 5 shows in particular the freezing means, which cools a collecting container (cooling chamber 16) for the excrement. This collecting container preferably has a shape indicated by the dashed line (17). The indicated conical protrusion of the base of the collecting container permits more uniform distribution of the excrement bags 3 in the container. Other measures are also possible for achieving the desired, very uniform distribution of the excrement bags 3 in the collecting container. Thus, the collecting container-which in this case is cylindrical-could be designed so that it is rotatable about its vertical axis 33.

Alternatively, a drop pipe 24 which is mounted on the base connection 23 via an outflow collar 34 and which has a pipe end 25 projecting obliquely downward is rotated, for example, synchronously with the activation of the closure 11, each time the lavatory is used, by a certain angular amount, for example by 20° to 45° (FIG. 5).

The collecting container consists as far as possible of a material which is not very adhesive, for example Teflon ®, or is coated with such a material. A cooling means 18 cools the walls and the base of the cooling chamber 16. The cooling means is charged with refrigerant via a suitable refrigerator, so that the content of the collecting tank freezes. The cooling system is heat-insulated on the outside, so that the cooling chamber 16 maintains its freezing temperature for a relatively long time even when the cooling means 18 fails.

In a preferred use of the lavatory, in aircraft, the cooling chamber 16, and hence the collecting tank, may be cooled with the aid of cold air, which is in any case available at high altitudes. All that is necessary here is to provide a suitable inlet and outlet line to carry the outside air to the cooling chamber 16, on which the cooling coil 21 of the cooling means 18 is located, or a separate cooling coil is provided for this purpose, or it is even possible to use the existing cooling coil for this purpose.

It is also possible to provide an auxiliary cooler 19 which is in turn form of, for example, heat exchanger and has cooling lines 20, and which is exposed, for example, to the cold outside air. Consequently, electrical cooling is unnecessary during the period when sufficient cold air is available.

In order on the one hand to optimize cooling of the excrement and on the other hand to avoid any odor nuisance with frequent use, the base connection 23 is, as shown in FIG. 5, in the form of a lock 26, with the closure 11 against the lavatory bowl 1 and the closure 11' against the cool chamber 16. The two closures 11 and 11' are thus never simultaneously open; closure 11' opens only when closure 11 is closed, in order to allow the excrement bag 3 to fall into the cool chamber 16.

The excrement bag 3 (FIG. 6) has a pouch 31 which is adjacent to a seat ring 30 shaped according to the seat edge 2 of the lavatory bowl 1, and which tapers downward and is formed from spiral folds. These folds allow the excrement bags 3 to be collapsed so that they are very flat (in the manner of tobacco pouches), since they fold adjacent to one another and not one on top of the other.

In a particularly user-friendly variant of the lavatory (FIG. 7), it is not the seat edge 2 formed on the toilet seat which is swivelled up; instead, the dispenser 104 is swivelled down onto the seat edge 102. This downward swivelling is preferably effected by means of a motor and gear 10, which swivels the dispenser 104 around an axle 22', so that the dispenser closes the lavatory bowl 101 like a cover. However, it is also possible for this covering of the lavatory bowl 101 by the dispenser 104 to be effected by lateral swivelling or displacement. The seat edge 102, which is provided with suction holes 6 in the manner described above, can in this case be formed on the top of the toilet bowl 101 itself. By applying the vacuum to the suction holes 6, the excrement bags 3 lying flat here are removed from the dispenser 104. To prevent more than one excrement bag 3 from being removed from the dispenser 104, a retaining mechanism (not shown) which is coupled to the triggering of the vacuum to the suction holes (as described below) is provided.

Since the excrement bags 3 are held at their outermost edge by the dispenser opening 32, the latter is somewhat smaller than the opening formed by the outer edge of the seat edge 2 (FIGS. 1 and 2) or 102 (FIG. 7). If the dispenser 4 (FIGS. 1 and 2) or 104 (FIG. 7) and the seat edge 2 or 102 are in the parallel position required for removal of the excrement bags 3, the suction holes 6 are inside the dispenser opening 32 and thus define the ideal dimensions of the dispenser opening 32. The excrement bags 3 can thus be optimally removed by means of the suction holes 6.

The excrement bag 3 is water-resistant and has a high tensile strength for at least a certain time, and preferably consists of recycled paper or of another biodegradable material, for example a natural, degradable film.

By means of its control, the lavatory can be operated in such a way that it is to a very large extent hygienically used; all manual operation can be dispensed with; activation of a switch, which in particular may be foot-operated, after use is all that is envisaged.

To achieve this object, at least the following must be applicable after use of the lavatory and activation of a switch, for example a foot pedal:
1. the vacuum at the suction holes 6 must be removed,
2. the vacuum at the lavatory bowl 1 must be removed,
3. the flap 11 must be opened,
4. the dispenser 4 or 104 and seat edge 2 or 102 must be brought into the relative positions required for removal of the excrement bag,
5. a vacuum must be applied via the suction line 9 to the suction holes 6 for removal of the excrement bag 3,
6. the flap 11 must be closed and a vacuum applied to the lavatory bowl, and
7. the dispenser 4 or 104 and seat edge 2 or 102 must be brought into the position for use.

Depending on the design of the lavatory and the extent to which it is used by the public, this procedure will be supplemented by further intermediate steps.

Table 1 gives a better overall view of the individual steps. Possible, supplementary intermediate steps, particularly in relation to any lock which may be present, are described in the following description of the process.

Various embodiments of the invention are described in the Examples below.

EXAMPLE 1

The dispenser 104 can be swivelled while the seat edge 102 is fixed (FIG. 7).

Figure 6:
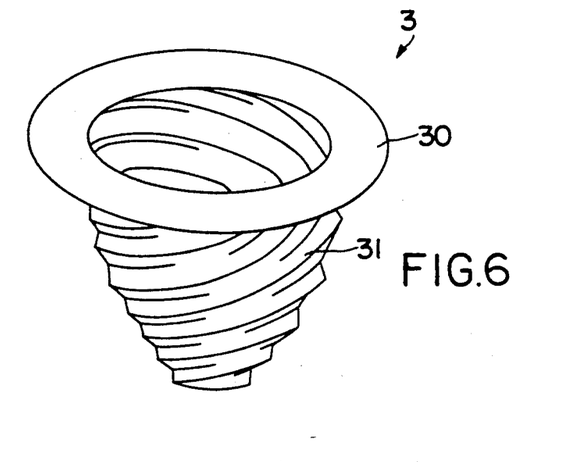
FIG. 6 shows a schematic representation of the unfolded excrement bag.

When a user enters the lavatory, the dispenser 104 should be resting on the seat edge 102. When the dispenser 104 is gently lifted, a vacuum is applied via the first suction line 8 to the suction holes 6, with the result that an excrement bag 3 is removed from the dispenser 104. Possibly simultaneously, but preferably with a time lag, controlled via a control element, a vacuum is generated in the lavatory bowl 101 via vacuum line 12, with the result that the excrement bag 3 is unfolded (FIG. 6). The dispenser 104 is completely swivelled back during these operations by means of a motor 10, and the vacuum line 12 to the lavatory bowl 101 is preferably cut off. Once the user is ready, he will have to activate a switch in a known manner, foot operation being preferred. This switch, which opens closure 11, for example via a lever mechanism, simultaneously causes the vacuum applied to the suction holes 6 to be cut off, while a vacuum is applied to the second suction line 27, which enters the cool chamber 16. If a lock 26 is provided between the lavatory bowl 101 and the said cool chamber (FIG. 5), which lock is intended both to avoid annoying ordors and to serve as a temperature lock, the third suction line 36 should be switched in, if necessary simultaneously with the second suction line 27. Consequently, the excrement bags 3 are further conveyed especially if they should jam in the region of the closure 11. The lock 26 functions in a known manner; as described above, after closure 11 has been closed the vacuum to the third suction line 36 is removed via a valve 15 and closure 11' is opened; the excrement bag 3 is conveyed into the cool chamber, supported by a vacuum in the second suction line 27. If the drop pipe 24 ends in a pipe end 25 (FIG. 5), or if the collecting container is rotatable, the pipe bend 25 will be rotated through a certain angle, for example by 20° to 45°, about the axis 33, or the collecting container will be rotated briefly, preferably simultaneously with the opening of the closure 11 (or also of closure 11' in the case of a lock 26). The closure 11' is closed again; the dispenser 104 is again swivelled down onto the seat edge 102 by means of the motor 10 no later than at this point in time, this process preferably being coupled with switching on of the vacuum in the second suction line 27 (or the third suction line 36). Thus, the lavatory cannot be used by mistake before the disposal process for the excrement bags 3 is complete.

EXAMPLE 2

The seat edge 2 formed on the lavatory seat is capable of being swivelled. The dispenser 4 is fixed (FIG. 1).

The lavatory should be capable of being used only when an excrement bag 3 has already been removed from the dispenser 4, fixed to the seat edge 2 by means of the vacuum applied at the suction holes 6 and unfolded by the vacuum applied to the lavatory bowl 1 via the vacuum line 12. By suitable switching or program control, it is ensured that the toilet seat, i.e. the swivelling seat edge 2, can then no longer be lifted, with the result that use of the lavatory without using the excrement bags 3 should be avoided. After the lavatory has been used, a switch will have to be operated in an appropriate manner, as described above; the disposal process corresponds to the process described above, except that, after disposal of the used bag, it is complete only after the seat edge 2 has been swivelled up, an excrement bag 3 has been removed, the seat edge 2 has been swivelled down and fixed and the new bag has been unfolded.

As described in the above Examples, the lavatory should be capable of being used only when an excrement bag 3 has already been unfolded and is on the seat edge. In order to save energy, the vacuum is generally not applied constantly to the suction holes 6, so that, in order to ensure adhesion of the excrement bags 3 to the seat edge 2 or 102 during use, this vacuum must be provided. This can be effected in various ways, for example in combination with opening of the lavatory doors, via an optical sensor, which should be in the form of a use sensor and not a presence sensor, or, in the case of the dispenser 104 covering the lavatory bowl 101, by slight raising of the dispenser 104.

The individual processes are preferably controlled by means of suitable time function elements; only opening of the closure 11 will be triggered in the usual manner by the user, for example by operating a foot pedal.

If a user should forget to operate this switch (foot pedal), a sequence regulator can be provided, which records the subsequent use (lavatory doors, sensor) before the disposal process takes place and automatically starts the disposal process, from opening of the closure 11 to the provision of new excrement bags.

A switch which prevents use of the lavatory, in combination with a signal for the service staff, should be provided, to operate when the final excrement bag 3 has been removed from the dispenser 4 or 104. In the variant with the swivelling dispenser 104, for example, it would no longer be possible to lift the latter, and a light indicator may also be provided. The design, equipment and control possibilities of the lavatory open up a wide range of uses, particularly in aircraft.

Not only the stated cold outside air but also a vacuum are in any case available, for example, in aircraft above a certain flying altitude, owing to the difference between cabin pressure and the pressure of the surrounding atomsphere. There is no pressure gradient or the pressure gradient is too small, for example when the aircraft is stationary, the vacuum required for functioning of the system can easily be generated via a suitable fan or a venturi tube, and the cooling effect can be replaced by a conventional cooling apparatus. The cooling apparatus can also reinforce the cooling effect of the cold air if this is insufficient.

The above operations may be carried out by means of a control including a use sensor, a sequence regulator, and switches operably connected to valves 9, 13, 14, and 15. The control also is operably connected to lever 11.2 to operate closure 11 and to motor 10 to swivel dispenser 33 (or to swivel seat edge 2 in the embodiment shown in FIG. 1).

LIST OF REFERENCE SYMBOLS 1, 101: Lavatory bowl
2, 102: Seat edge
3: Excrement bag
4, 104: Dispenser
5: Springs
6: Suction holes
7: Suction channel
8: First suction line
9: Vacuum valve in 8
10: Motor
11: Closure, flap-like
12: Vacuum line
13: Valve in 12
14: Valve in 27
15: Valve in 36
16: Cool chamber
17: Collecting container base
18: Cooling means for 16
19: Auxiliary cooler (heat exchanger)
20: Cooling lines
21: Cooling coil
22: Axle (for the lavatory seat)
22: Axle (for the dispenser)
23: Base connection
24: Drop pipe
25: Pipe bend
26: Lock
27: Second suction line in the cool chamber 16
28: Sensor
29: Time function element
30: Seat ring
31: Pouch 32: Dispenser opening
33: Vertical axis
34: Outflow collar
35: Switch, foot-operated
36: Third suction line (in the lock).

What is claimed is:

1. A lavatory comprising
   a lavatory bowl having an upper side on which a seat edge is provided and a lower side on which a base connection is provided,
   a dispenser for receiving stacked excrement bags that can be removed individually from said dispenser and secured to said seat edge with the aid of a vacuum,
   a vacuum line that enters said lavatory bowl and a suction line,
   and a stack of excrement bags that lie flat one on top of the other, wherein
   said dispenser has a receptacle with said stack of excrement bags removably positioned therein,
   said seat edge is provided with suction holes connected to said suction line, and
   said dispenser is adapted to be mounted with respect to said bowl such that
   said seat edge and said dispenser can be brought into a relative position in which said seat edge and said excrement bags are parallel to one another, whereby the foremost of said excrement bags can be sucked-out of said dispenser and secured to said seat by negative pressure in said suction line and subsequently opened into said bowl by negative pressure in said vacuum line.

2. A lavatory as claimed in claim 1, wherein said seat edge is formed on a lavatory seat that is fastened so that it can rotate about an axle on said lavatory bowl.

3. A lavatory as claimed in claim 2, wherein said first suction line is connected to said seat edge in the region of said axle to apply vacuum to said suction holes.

4. A lavatory as claimed in claim 2, wherein said dispenser is fastened immobile to hold said stack of excrement bags in a substantially vertical position.

5. A lavatory as claimed in claim 1, wherein said seat edge is formed by an edge of said lavatory bowl, and said dispenser can be brought from a rest position in which it is at a distance from said upper side of said lavatory bowl into a covering position in which it covers said lavatory bowl in the manner of a lid.

6. A lavatory as claimed in claim 5, wherein said dispenser is arranged to be swivelled about a horizontal axle, between said rest position and said covered position.

7. A lavatory as claimed in claim 1, wherein a motor is provided by means of which said seat edge and said dispenser can be brought into said relative position.

8. A lavatory as claimed in claim 7, wherein said motor is a pneumatic motor having a piston/cylinder unit.

9. A lavatory as claimed in claim 1, wherein a bag storage chamber is connected via said base connection to a space enclosed by said lavatory bowl.

10. A lavatory as claimed in claim 9, wherein said base connection is connected to a drop pipe.

11. A lavatory as claimed in claim 10, wherein said drop pipe ends in a rotatable pipe bend.

12. A lavatory as claimed in claim 10, wherein a lock formed by two closures is provided between said lavatory bowl and said drop pipe.

13. A lavatory as claimed in claim 12, wherein a third suction line enters said lock.

14. A lavatory as claimed in claim 9, wherein said bag storage chamber is in the form of a cool chamber having a cooling means for the excrement.

15. A lavatory as claimed in claim 14, wherein closure means are arranged to close said cool chamber.

16. A lavatory as claimed in claim 15, wherein a second suction line is connected to said cool chamber.

17. A lavatory as claimed in claim 15, wherein said cool chamber is comprised of a removable collecting container enclosed by a stationary inlet and outlet line for a refrigerant.

18. A lavatory as claimed in claim 15, wherein said cooling means for said cool chamber is designed to provide a temperature below $-10$ degrees C.

19. A lavatory as claimed in claim 18, wherein said cooling means can be connected to cold outside air.

20. A lavatory as claimed in claim 18, wherein said cooling means is designed to provide a temperature below $-15$ degrees C.

21. An excrement bag for a lavatory as claimed in one of claims 1 to 6, comprising a pouch connected to a seat ring having a form corresponding to said seat edge and capable of being folded flat in a bellows-like manner.

22. An excrement bag as claimed in claim 21, which is spirally folded.

23. An excrement bag as claimed in claim 22, wherein said excrement bag is composed of degradeable material.

24. A control for a lavatory having
   a lavatory bowl with an upper side and a lower side, said upper side being provided with a seat edge, said lower side being provided with a base connection containing a first closure,
   a dispenser for excrement bags that can be removed individually from said dispenser and secured to said seat edge with the aid of a negative pressure,
   a motor for moving said seat edge relative to said dispenser,
   a suction line and a vacuum line that enters said lavatory bowl, said suction line and said vacuum line each being provided with a valve, said seat edge being provided with suction holes connectable to said suction line, comprising the following control means with reference to a used lavatory:
   control means for closing said valve in said suction line and said valve in said vacuum line to detach said excrement bag from said lavatory bowl;
   control means for opening said first closure to remove said excrement bag from said lavatory bowl;
   control means for switching on said motor to swivel said seat edge up to said dispenser;
   control means for opening said valve in said suction line, that is connectable to said suction holes to remove a new one of said excrement bags and fix said new excrement bag to said seat edge;
   control means for closing said first closure;
   control means for opening said valve to said vacuum line to unfold said excrement bag; and
   control means for switching on said motor for swivelling down said seat edge and fixing it.

25. A control for a lavatory having
   a lavatory bowl with an upper side and a lower side, said upper side being provided with a seat edge, said lower side being provided with a base connection containing a first closure, a dispenser for excrement bags that can be removed individually from said dispenser and secured to said seat edge with the aid of a negative pressure, a motor for moving said dispenser relative to said seat edge, a suction line and a vacuum line that enters said lavatory bowl, said suction line and said vacuum line each being provided with a valve, said seat edge being provided with suction holes connectable to said suction line, comprising the following control means with reference to a used lavatory;

control means for closing said valve in said suction line and said valve to said vacuum line to detach said excrement bag from said lavatory bowl;

control means for opening said first closure to remove said excrement bag from said lavatory bowl;

control means for switching on said motor to swivel said dispenser down on to said seat edge;

control means for opening said valve to said suction line that is connectable to said suction holes to remove a new one of said excrement bags and fix said new excrement bag to said seat edge;

control means for closing said first closure; control means for opening said valve to said vacuum line to unfold said excrement bag; and control means for switching on said motor to swivel back and raise said dispenser.

26. A control as claimed in one of claims 24 or 25 for a lavatory having a drop pipe and a cool bag storage chamber both connected via said base connection to said lavatory bowl and a second suction line connectable to said cool bag storage chamber, said second suction line being provided with a valve, wherein said control includes one of the following control means:

time dependent control means for closing said valve to said vacuum line after said excrement bag has been unfolded, to save suction power during use;

control means, coupled with opening of a first closure, for opening said valve to said second suction line to facilitate conveying of said excrement bag into said cool bag storage chamber;

in a lavatory having a pipe bend in said drop pipe, control means, coupled with opening of said first closure, for rotating said pipe bend for distribution of said excrement bags in said cool bag storage chamber;

in a lavatory having said cool bag storage container in the form of a collecting container, control means, coupled with opening of said first closure, for small rotation of said collecting container, for distribution of said excrement bags in said collecting container;

control means for closing said first closure to reduce annoying odors and to create a closed vacuum space in said lavatory bowl to unfold said excrement bags;

control means, coupled with closing of said first closure, for closing said valve to said second suction line to save suction power after disposal of said excrement bag;

control means, coupled with raising of said dispenser, for opening said valve to said first suction line to fix said excrement bag firmly to said seat edge;

control means in the form of a use sensor, for opening said valve to said first suction line to provide vacuum for fixing said excrement bag firmly to said seat edge;

control means in the form of a sequence regulator coupled to said means for switching on said motor, to perform a disposal process and to provide a new excrement bag after said means for switching on said motor has been activated;

control means in the form of a use sensor and control means in the form of a sequence regulator, to prepare the lavatory for use, even if a previous user did not activate said means for switching on said motor after use;

control means, coupled with removal of a final excrement bag from said dispenser, for controlling said means for switching on said motor for fixing said dispenser;

control means, coupled with removal of a final excrement bag from said dispenser, for triggering a signal as an indication that said lavatory cannot be used;

in a lavatory having a temperature sensor, an outside air cooling means and an internal air cooling means, control means, coupled to said temperature sensor, for switching over from said outside air cooling means to said internal cooling means;

in a lavatory having a pressure gauge, an internal pressure source and means for switching to outside pressure, control means, coupled to said pressure gauge, for switching over from said internal pressure source to low outside pressure.

27. A control as claimed in claim 26 wherein said control means for rotating said pipe, rotates said pipe from about 20 to 45 degrees, upon an opening of said first closure.

28. A control as claimed in claim 26, for a lavatory having a second closure that forms a lock with said first closure between said lavatory bowl and said cool bag storage chamber, and a third suction line into said lock, said third suction line being provided with a valve, wherein said control includes one of the following control means:

control means, coupled with opening of said first closure, for opening said valve to said third suction line into said lock, to facilitate conveying of said excrement bags into said lock;

control means, coupled with closing of said first closure, for opening said second closure and simultaneously opening said valve to said second suction line to facilitate conveying of said excrement bag from said lock into said cool bag storage chamber;

control means, coupled with closing of said first closure, for closing said valve to said third suction line into said lock and for simultaneously opening said second closure; and control means, coupled with closing of said first closure, for closing said valve to said second suction line to save suction power after disposal of said excrement bag.

* * * * *